R. S. CATHCART.

Clothes-Wringers.

No. 5,360. Reissued April 22, 1873.

Witnesses:
T. C. Brecht.
John R. Young

Inventor:
R. S. Cathcart, by
Prindle and Co. his
attorneys

AM. PHOTO-LITHOGRAPHIC CO. N.Y. (OSBORNE'S PROCESS.)

UNITED STATES PATENT OFFICE.

RODNEY S. CATHCART, OF CINCINNATI, OHIO, ASSIGNOR, BY MESNE ASSIGNMENTS, TO THE QUEEN CITY WRINGER COMPANY, OF SAME PLACE.

IMPROVEMENT IN CLOTHES-WRINGERS.

Specification forming part of Letters Patent No. 131,392, dated September 17, 1872; reissue No. 5,360, dated April 22, 1873; application filed April 4, 1873.

*To all whom it may concern:*

Be it known that I, RODNEY S. CATHCART, of Cincinnati, in the county of Hamilton and State of Ohio, did invent certain new and useful Improvements in Wringing-Machines, for which Letters Patent No. 131,392 were issued to me upon the 17th day of September, 1872, which Letters Patent have been found defective in that the specification and claims do not cover and embrace all of the original invention and improvements as contained in the model and drawings filed in the United States Patent Office; now, therefore, being desirous to reissue the said Letters Patent, in the manner and form prescribed by law, I have prepared and do hereby declare that the following is a full, clear, and exact description of the said improvements, reference being had to the accompanying drawing making a part of this specification, in which—

Figure 1:
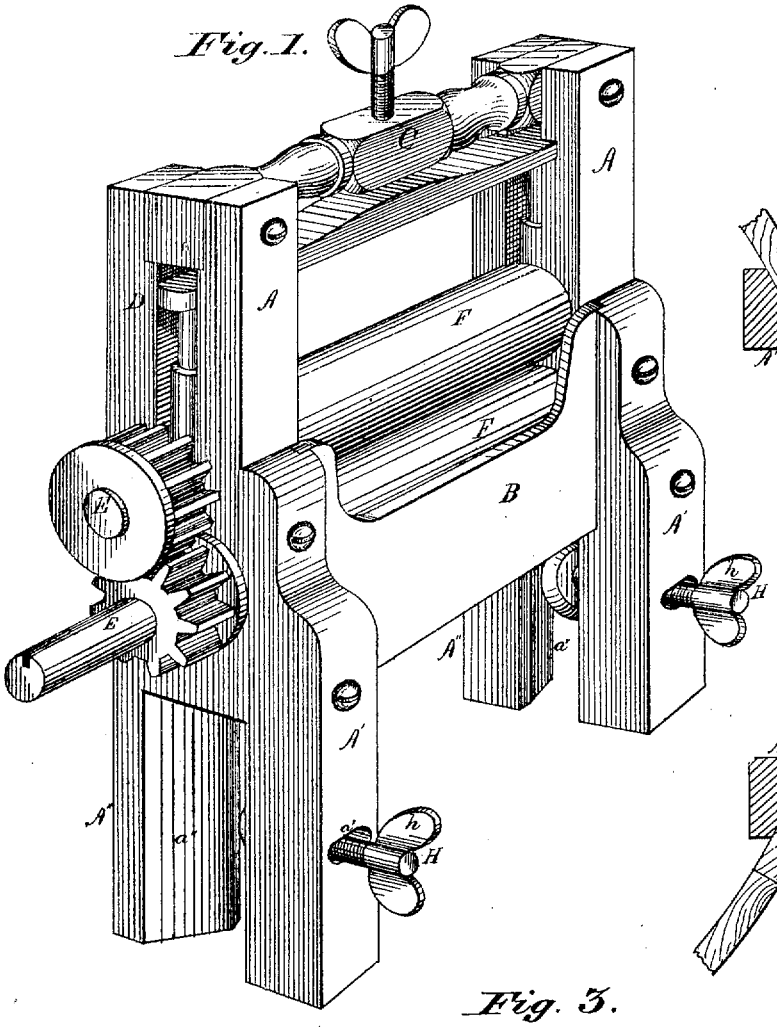
Figure 2:
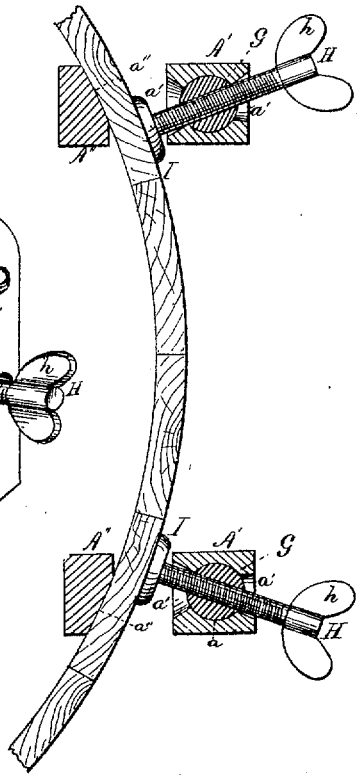
Figure 3:
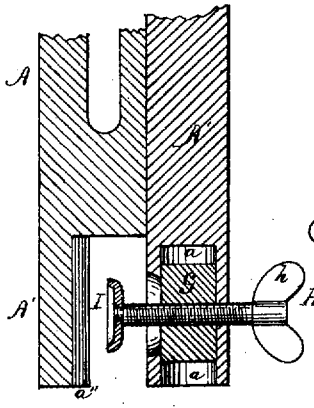

Figure 1 is a perspective view of a wringer containing my improvements. Fig. 2 is a horizontal section of the same upon a line passing through the clamping-screws, showing the manner of clamping the machine to a tub; and Fig. 3 is a vertical central section of one of the legs upon a line extending from front to rear.

Letters of like name and kind refer to like parts in each of the figures.

The object of my invention is to enable a wringer to be adjusted to and secured upon the side of a rectangular or round tub with equal facility; and to this end it consists principally in combining a clamp-screw and cylindrical nut with a clothes-wringer leg provided with a vertical cylindrical opening and a transverse slot, substantially as and for the purpose hereinafter specified. It consists, further, in combining with the elements above named a second wringer-leg, having its inner face chamfered laterally outward, substantially as and for the purpose hereinafter shown.

In the annexed drawing, A and A represent the frame-posts, bifurcated at their lower ends in the usual manner, and connected together by means of a slat, B, which extends horizontally between their vertical centers, and a bar, C, that extends between their upper ends, and has its ends contained within suitable recesses or sockets formed within the same. Extending downward from the upper end of each post A, to a point near its longitudinal center, is a slot, D, which passes transversely through the same upon a central line that coincides with the opposite post, which slots receive and contain the boxes and journals of the shaft E of the rollers F, all in the usual manner. Within one of the legs A′ of each post A is provided a cylindrical opening, *a*, which extends from its lower end vertically upward through the center of said post to a point near its upper end. At or near the vertical center of said post is provided a slot, *a′*, which extends horizontally through the transverse center of the same upon a line passing from front to rear, and at its inner and outer ends is elongated horizontally. Within the opening *a* is placed a correspondingly-shaped metal bar, G, which is provided with a central transverse opening that is threaded, and corresponds to and receives a clamp-screw, H, which screw passes through said bar or nut and through the slot *a′*, and is provided upon its outer end with wing thumb-pieces *h*, and upon its inner end with a pivoted bearing-button, I. As thus arranged it will be seen that the clamp-screw H is permitted to move freely in a horizontal plane upon or with its pivoted nut, so as thereby to enable its bearing end to conform to the curvature of a tub, to which the wringer is to be attached, and cause said screw to assume and maintain a position upon a line radial to said tub.

In order that the machine may be more readily fitted to or upon a round tub, the inner face *a″* of the rear leg A″ is chamfered from its outer edge inward to or near its inner edge, as seen in Fig. 2.

The improvements described materially increase the efficiency and durability of the wringer, and enable it to be used with equal facility upon either round or square tubs, and further prevent all injury to the sides of said tubs by the usual unequal bearing of the clamp-screw buttons.

Having thus fully set forth the nature and merits of my invention, what I claim as new, is—

1. In combination with the leg A′, provided with the vertical opening *a* and transverse slot *a′*, the cylindrical nut G, and clamp-screw H, substantially as and for the purpose specified.

2. In combination with the leg A′, provided with the swiveled clamp-screw H, the leg A″, having its inner face *a″* chamfered outward and rearward, substantially as and for the purpose shown.

In testimony whereof I have hereunto set my hand this 31st day of March, 1873.

RODNEY S. CATHCART.

Witnesses:

W. E. WATSON,

C. J. O'HARA.